(12) United States Patent
Ruffino et al.

(10) Patent No.: US 7,586,897 B2
(45) Date of Patent: Sep. 8, 2009

(54) METHOD FOR CONTROLLING ROUTING OPERATIONS IN A NETWORK, RELATED NETWORK AND COMPUTER PROGRAM PRODUCT THEREOF

(75) Inventors: Simone Ruffino, Turin (IT); Patrick Stupar, Turin (IT)

(73) Assignee: Telecom Italis S.p.A., Milan (IT)

( * ) Notice: Subject to any disclaimer, the term of this patent is extended or adjusted under 35 U.S.C. 154(b) by 255 days.

(21) Appl. No.: 11/666,619

(22) PCT Filed: Oct. 29, 2004

(86) PCT No.: PCT/IT2004/000600

§ 371 (c)(1),
(2), (4) Date: Jun. 19, 2007

(87) PCT Pub. No.: WO2006/046261

PCT Pub. Date: May 4, 2006

(65) Prior Publication Data

US 2007/0258473 A1    Nov. 8, 2007

(51) Int. Cl.
*H04L 12/28* (2006.01)
(52) U.S. Cl. .............. 370/351; 370/389; 370/390; 370/401; 709/217; 709/220; 709/239
(58) Field of Classification Search .......... 370/351, 370/389, 390, 395.31, 401; 709/217, 220, 709/221, 238, 239, 243
See application file for complete search history.

(56) References Cited

U.S. PATENT DOCUMENTS 5,636,216 A * 6/1997 Fox et al. .................. 370/402

6,850,532 B2 * 2/2005 Thubert et al. ............. 370/401
6,865,184 B2 * 3/2005 Thubert et al. ............. 370/401

(Continued)

FOREIGN PATENT DOCUMENTS

EP    1111874 A1 *  6/2001

OTHER PUBLICATIONS

Wakikawa, R. et al., "Global connectivity for IPv6 Mobile Ad Hoc Networks," Mobile Ad Hoc Networking Working Group, Internet Draft, draft-wakikawa-manet-globalv6-01.txt, pp. i-ii and 1-25, (Jul. 1, 2002).*

(Continued)

*Primary Examiner*—Hassan Kizou
*Assistant Examiner*—Benjamin Elliott
(74) *Attorney, Agent, or Firm*—Finnegan, Henderson, Farabow, Garrett & Dunner, L.L.P.

(57) ABSTRACT

A communication network with controlled routing operations, including a set of nodes, wherein topological information on the network is broadcast to all the nodes in the set. The network is associated with an external network, such as, a standard public network, and certain nodes are configured to perform a gateway function between the network and the associated external network. Each node is configured for building two sets of addresses including one primary address, which is fixed and independent from the prefixes announced by the gateways and one or more secondary addresses which are valid global IP addresses, based on the global prefixes announced by the gateways. Each node in the network is configured for using one of the secondary addresses as the source address of outgoing traffic, and for generating and broadcasting multiple interface messages containing all its secondary addresses in the place of interface addresses.

28 Claims, 6 Drawing Sheets

U.S. PATENT DOCUMENTS

| | | | |
|---|---|---|---|
| 7,149,225 B2* | 12/2006 | Thubert et al. | 370/401 |
| 7,209,978 B2* | 4/2007 | Thubert et al. | 709/242 |
| 7,327,683 B2* | 2/2008 | Ogier et al. | 370/236 |
| 7,443,880 B2* | 10/2008 | Wetterwald et al. | 370/466 |
| 2004/0057440 A1* | 3/2004 | Thubert et al. | 370/401 |
| 2004/0202183 A1* | 10/2004 | Thubert et al. | 370/395.31 |
| 2005/0083859 A1* | 4/2005 | Kang | 370/254 |
| 2005/0265259 A1* | 12/2005 | Thubert et al. | 370/255 |

OTHER PUBLICATIONS

Baker, F., "An outsider's view of MANET", Network Working Group, Internet Draft, draft-baker-manet-review-01, pp. 1-39, (Mar. 17, 2002).*

Clausen, T. et al., "Optimized Link State Routing Protocol (OLSR)," Network Working Group, IETF Standard, RFC 3626, pp. 1-75, (Oct. 2003).

Engelstad, P. E. et al., "Internet Connectivity for Multi-Homed Proactive Ad Hoc Networks," Proceedings of IEEE International Conference on Communication (ICC 2004), 7 pages, (Jun. 2004).

Jelger, C. et al., "Gateway and Address Auto-Configuration for IPv6 Ad-Hoc Networks," IETF Internet Draft, pp. 1-21, (Apr. 2004).

Cha, H. et al., "Extend Support for Global Connectivity for IPv6 Mobile Ad Hoc Networks," IETF Internet draft-cha-manet-extended-support-globalv6-00.txt, pp. 1-15, (Oct. 2003).

Laouiti, A. et al., "OLSR for IPv6 Networks," Proceedings of Med-Hoc 2004, pp. 460-469, (Jun. 2004).

Dupont, F. et al., "IMEI-Based Universal IPv6 Interface IDS," IETF Internet Draft, http://www.ietf.org/internet-drafts/draft-dupon-ipv6-imei-07.text, pp. 1-5, (Jun. 2004).

Paakkönen, P. et al., "IPv6 Prefix Delegation-Based Addressing Solution for a Mobile Personal Area Network," Proceedings of the 23$^{rd}$ Intl. Conf. on Distributed Computing Systems Workshops (ICDCSW '03), 7 pages, (2003).

Kim, B-Y, et al., "Hierarchical Prefix Delegation Protocol for Internet Protocol Version 6 (IPv6)," draft-bykim-ipv6-hpd-00.txt, pp. 1-12, (Oct. 20, 2003).

* cited by examiner

METHOD FOR CONTROLLING ROUTING OPERATIONS IN A NETWORK, RELATED NETWORK AND COMPUTER PROGRAM PRODUCT THEREOF

CROSS REFERENCE TO RELATED APPLICATION

This application is a national phase application based on PCT/IT2004/000600, filed Oct. 29, 2004, the content of which is incorporated herein by reference.

1. Field of the Invention

The present invention relates to techniques for monitoring and controlling routing operations in communication networks, and has been developed by paying specific attention to the possible application in wireless Mobile Ad-hoc Networks (MANETs).

2. Description of the Related Art

MANETs are wireless networks characterized by the absence of any infrastructure: nodes of a MANET operate both as hosts (i.e. they are end-points of a communication) and as routers. In fact packets that cannot be directly delivered between two nodes are routed through other intermediate nodes following a multi-hop path to reach their destination.

Routing within a MANET is enabled by a routing protocol, which has to run on every node belonging to the MANET, called "MANET node": by exchanging control messages the nodes calculate the optimal path that data packets must follow within the network. Nodes typically own a unique identifier, which is used for routing purposes and/or data exchange.

A MANET can be an isolated network or can be connected to an external network through one or more nodes which act as gateways.

In particular, if nodes belonging to the MANET run the Internet Protocol and the Mobile Ad-hoc Network is connected to an external IP network (e.g. the global Internet), global connectivity has to be guaranteed, i.e. each MANET node has to be identified by a valid IP address which is necessary to receive packets transmitted by hosts located outside the Mobile Ad-hoc Network.

Routing issues in MANETs are mainly handled by the Internet Engineering Task Force (IETF), where a number of MANET routing protocols have been proposed. Among those MANET routing protocols, the Optimized Link State Routing (OLSR) protocol has been standardized.

The document by T. Clausen, P. Jacquet, "Optimized Link State Routing Protocol (OLSR)", IETF standard, RFC 3626 describes in detail the Optimized Link State Routing protocol. This is the first of a series of references made in this description to IETF documents. At the time this application is filed, all of the IETF documents cited herein can be freely accessed with the IETF website at http://www.ietf.org.

OLSR is a "proactive" routing protocol: this means that control messages containing topological information of the Mobile Ad-hoc Networks are periodically generated, and transmitted, by each node belonging to the MANET. By means of such packets a MANET node knows a path towards every other MANET node (i.e. the complete topology of the network).

Moreover, the OLSR protocol enables a MANET node to discover gateways connecting the Mobile Ad-hoc Network to external networks and to build a route to such gateways. For this purpose, the Optimized Link State Routing protocol defines a particular type of routing messages to perform gateway discovery. Each MANET node can therefore calculate the routes towards the gateways and choose the optimal one (i.e. the default gateway), with respect to the number of hops, which will be used to send packets to hosts located in the external network (i.e. uplink traffic).

The OLSR protocol does not cope with the IP address configuration of the nodes and assumes that each interface on each node is configured with a unique IP address, by means of an unspecified configuration mechanism.

A number of methods for automatic address configuration have been proposed by the Internet Engineering Task Force. Some of those proposals focus on issues related to global connectivity, such as address configuration in case of MANETs, where Internet connectivity is achieved through one or more gateways.

In the document P. E. Engelstad, A. Tonnesen, A. Hafslund, G. Egeland, "Internet Connectivity for Multi-Homed Proactive Ad Hoc Networks", in Proceedings of IEEE International Conference on Communication (ICC 2004), Paris, June 2004, the authors consider a MANET connected to the Internet by means of one or more gateways, where all the nodes are IPv4 nodes and the OLSR protocol is used as routing algorithm within the MANET. Additionally, the authors propose two solutions to handle global connectivity, based upon a Network Address Translator (NAT) mechanism and a Mobile IPv4 (MIPv4) protocol, respectively.

In the solution based on the NAT mechanism, every gateway runs the NAT: this implies that each gateway replaces the source address of data packets destined outside the MANET with its own global address (which is routable on the external network). By means of such a change, the IP source address of outgoing data packets is a globally routable address: return traffic flows through a given gateway towards its destination, located in the MANET. Hence, an external host will return packets using the IP address of the NAT-gateway as destination IP address. The gateway can then replace the destination IP address with the IP address of the MANET node and inject the return traffic into the MANET. The use of the NAT protocol implies that all packets of the same Transmission Control Protocol (TCP) session must be routed through the same gateway. The authors of the cited article show that such characteristic is not compatible with the mechanism used by the OLSR protocol to choose the default gateway, which can be replaced after a topological change. Such replacement causes the failure of all active TCP sessions: in order to avoid it, authors propose the use of IP tunneling to route all the packets through the same gateway.

The Applicant notes that the use of tunneling in solutions based on NAT implies a sub-optimal routing and, consequently, a loss of performances: this is because tunneling is set-up always towards the same gateway, irrespectively of position of the node, which could use a better gateway to forward traffic.

The solution based on the Mobile IPv4 protocol assumes that each MANET node runs the Mobile IPv4 protocol, which addresses the problem of maintaining session continuity after a node has changed the network with it is connected.

A mobile node running MIPv4 is uniquely identified by an address, named Home Address, belonging to a Home Network. Mobile IPv4 defines two functional entities named MIP-Home Agent (MIP-HA) and MIP-Foreign Agent (MIP-FA), respectively located in the Home Network and in the Foreign (i.e. Visited) Network. When the mobile node roams to the Foreign Network, it discover the presence of one or more MIP-Foreign Agents and, using Mobile IPv4 signaling, registers the public address of one of the discovered MIP-Foreign Agents, named Care-of Address, to its MIP-Home Agent.

After such registration, the MIP-Home Agent intercepts all traffic directed to the mobile node on its Home Network and tunnels it towards Care-of Address on the MIP-Foreign Agent, which, in turn, directly delivers it to the mobile node. After changing the network it is connected to, the mobile node discovers a new MIP-Foreign Agent and registers the new Care-of-Address to its Home Agent: the Home agent executes traffic redirection. The applications use the Home Address, which does not change during roaming, as the endpoint for communication and data session continuity is maintained.

This solution assumes that gateways act as MIP-Foreign Agents: a mobile node elects the chosen default gateway as its MIP-Foreign Agent. Use of Mobile IPv4 guarantees global connectivity, since each MANET node is uniquely identified by a Home Address, which is reachable from external hosts: traffic directed to Home Address is tunneled by the Home Agent towards the default gateway (acting as MIP-Foreign Agent), which in turn delivers it to the nodes through a multi-hop path.

Moreover, the default gateway change causes also a MIP-Foreign Agent change, but without breaking any communication session: a node registers its new MIP-Foreign Agent with its Home Agent and the Mobile IPv4 protocol ensures sessions continuity. Again, the authors of the article cited in the foregoing note that this solution implies modifications to the standard operations of Mobile IPv4, which mandates mobile node and Foreign Agent to be on the same link. Other IETF contributions propose various ways of connecting an IPv6 MANET to the global Internet by means of multiple gateways.

For instance, R. Wakikawa, J. Malinen, C. Perkins, A. Nilsson, A. Tuominen, in "Global connectivity for IPv6 Mobile Ad Hoc Networks", IETF Internet expired draft, draft-wakikawa-manet-globalv6-03.txt, specify two mechanisms through which a MANET node can discover gateways and can obtain a global IPv6 prefix from which it can build its global IPv6 address.

The first mechanism is based upon a reactive solicitation of gateways information by a node which needs global connectivity. The second mechanism is based upon a periodical advertisement of gateway information executed by gateways themselves. In the captioned article, the authors suggest that both mechanisms can be realized modifying either the routing protocol or the standard Neighbor Discovery Protocol (NDP) defined by IPv6. Such modification consists in configuring a temporary address on the nodes to join routing protocol and receive a global prefix, by means of modified routing messages or modified Neighbor Discovery Protocol messages: temporary addresses are obtained using an IPv6 stateless auto-configuration mechanism, starting from a pre-defined MANET_LOCAL prefix. Moreover, if the nodes run a Mobile IPv6 (MIPv6) protocol, the Mobile IPv6 Home Address can also be used as temporary address.

Such solution is used when a node first joins a MANET. The Applicant notes that the same address configuration mechanism is applicable also when a node must change its global address: this could happen when its current gateway leaves the MANET, or fails or when the node chooses to change its default gateway within the MANET because of performance reasons. If any of the cases above applies, the MANET node experiments a significant delay, given by the time needed to choose a new default gateway, configure a global address built from a prefix received by chosen gateway and re-join routing protocol with such new global address. During this time, it will not be reachable neither from the other MANET nodes nor from the outside nodes, because all its generated messages contents are useless, since they have been associated to an address no more valid. Therefore, in such cases a generic MANET element cannot route data traffic to the node that has changed its address, until it has received enough messages generated by the node and containing the topological information associated to the new global address.

Specifically, if a proactive routing protocol is used within the MANET, the time needed by a node to choose a new gateway is negligible, while the amount of time, here defined "Routing Convergence Latency", needed to propagate new address information by means of routing messages to the whole MANET can be significant, heavily depending on routing settings and MANET topology and cardinality.

C. Jelger, T. Noel, A. Frey, "Gateway and address auto-configuration for IPv6 ad-hoc networks", IETF Internet draft (as available at http://www.ietf.org/internet-drafts/draft-jelger-manet-Gateway-autoconf-v6-02.txt, propose a solution in which every gateway in a MANET periodically broadcasts its global prefix to all its first-hop neighbors (i.e. the nodes which are directly connected to it), which, in turn, after configuring their global address, periodically broadcast to all their neighbors the information about the chosen global prefix (and the correspondent gateway). This means that a node receives only the information about the global prefixes used by its neighbors to configure their global addresses. The proposed global prefix selection and propagation mechanism enable the prefix continuity, i.e. the existence of a path, between a node and the gateway whose global prefix has been chosen, made of nodes which have configured their global address with such global prefix too.

The Applicant notes that, in case of a global address change, due to gateway failure, loss of connectivity towards the chosen gateway or performance reasons, a node experiences a similar delay as the one introduced in the document by R. Wakikawa et al. and previously described.

H. Cha, J. Park, H. Kim, in "Extend Support for Global Connectivity for IPv6 Mobile Ad Hoc Networks" IETF Internet expired draft, draft-cha-manet-extended-support-globalv6-00.txt, October 2003, proposes a solution, inspired by Mobile IP, which permits to maintain upper layer session continuity after a partitioning occurs. This document considers a scenario of a MANET characterized by frequent split and merging processes. When a MANET splits into two or more MANETs, it may happen that a node cannot find a route towards its current default gateway. The node can choose a new default gateway, but, for downlink traffic reception, the node needs a new global address obtained from a global prefix associated to the new default gateway.

The proposed solution extends the mechanism proposed in the above-mentioned document of R. Wakikawa et al. (i.e. solicitation—advertisement method). A MANET node uses a global address obtained by its default gateway to start a session with a host located outside the MANET. The default gateway from which the node has obtained such global address acts as Home Agent. In case of loss of connectivity towards such gateway after a network split, the node will receive from its new default gateway a new global address, named Locator, used as Care of Address. The node registers the Locator to the gateway acting as Home Agent, which tunnels back to the Locator all the traffic destined to the global address of the node.

The Applicant notes that such gateway must therefore always be active and its failure implies session break and procedure failure. Moreover, in order to obtain a new Locator, the node experiences delays similar to those described above. Moreover, gateways must maintain and update address information related to all nodes to which they assigned an address.

A. Laouiti, S. Boudjit, P. Minet and C. Adjih, "OLSR for IPv6 Networks", in Proceedings of Med-Hoc 2004, June 2004 propose a number of changes in the basic OLSR protocol, to enable it to perform IPv6 stateless auto-configuration. The auto-configuration procedure relies on two sub procedures: a reactive duplicate address detection process, triggered when a node first join a MANET, and a periodic duplicate address checking process. Both processes use routing protocol messages: in particular, a new type of OSLR message named "Multiple Address Declaration", which contains all the Ipv6 addresses configured on the network interface, is disclosed in order to perform the periodic checking.

The Applicant observes that the specific case of an isolated MANET, with no connection to an external network, is considered. In case of address change, especially in the presence of gateways in the MANET, can bring delays similar to those explained above.

Document US20040057440A1 proposes a solution to achieve global connectivity, using Mobile IPv6. Gateways run Mobile IPv6 protocol and register MANET nodes, which do not need to run Mipv6, to their respective Home Agents. MANET nodes discover gateways by means of a proactive routing protocol such as Optimized Link State Routing (OLSR) or Open Shortest Path First (OSPF).

The Applicant notes that an ordinary MANET node cannot become a gateway in any instant, because Mobile IPv6 is not supported by MANET nodes. So in case of gateway failure, MANET gets disconnected from the Internet.

OBJECT AND SUMMARY OF THE INVENTION

All the prior art arrangements discussed in the foregoing aim at obtaining a globally routable address a MANET node can use to send traffic outside the respective MANET.

The solutions proposed by the above documents of R. Wakikawa et al., C. Jelger et al., and H. Cha et al. do not consider the latency introduced by the acquisition of the global address after a gateway change and the consequences that such global address change may cause on routing protocol.

The solutions proposed in the above documents of H. Cha et al. and P. Thubert et al. operate correctly only if there are no gateway failures: this cannot always be the case, due to the unpredictable nature of a MANET.

Moreover, routing latency has a negative impact over the Mobile IPv6 performance, when supported by MANET nodes: during this period, the Binding Acknowledgment sent by the Home Agent and received by a gateway, cannot be immediately routed to the MANET node which sent the Binding Update, because gateway must first discover a path to the Care-of address of the node, which changed its address. As a consequence, the node starts Mobile IP back-off procedure and the handover cannot be seamless.

The object of the present invention is thus to provide an improved technique for monitoring and controlling routing operation in communication networks adapted to overcome the limitations of the previous arrangements considered in the foregoing.

The Applicant has found that the above mentioned problem can be at least partially solved by providing a method for controlling routing operations wherein the gateways announce global prefixes to the other nodes, where they are used to build a plurality of valid global IP node addresses, and finally these valid global IP node addresses are broadcast to all the nodes of the network.

The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

A preferred embodiment of the invention reduces the Routing Convergence Latency generated in a MANET by Optimized Link State Routing Multi-Provider Router (OLSR-MPR) election mechanism and topological data propagation, as the result of global address change. In such an arrangement, each node of the network builds two set of addresses:

one Primary Address, which is fixed and independent from the prefixes announced by gateways, and one or more Secondary Addresses, which are valid global IPv6 addresses, built using the global prefixes announced by Gateways; each node uses one of such addresses as source address of the outgoing traffic.

For the purposes of the present invention, with "valid global address" it is intended an address which is globally routable, i.e. reachable from all hosts and routers located within external networks (e.g. the Internet).

Each node inserts all its secondary addresses into its broadcasted Multiple Interface Declaration (MID) messages, or "MI messages". Moreover, the exemplary arrangement described herein thus introduces a new type of OLSR messages, called PA (Prefix Advertisement), which are periodically generated and broadcasted by the gateways. Each gateway inserts into the generated Prefix Advertisement messages its global prefixes.

A node is reachable with no significant delay even after its address changes: the connectivity within the MANET is achieved through the primary address while global connectivity is achieved by MID messages processing, as every configured global address is a secondary address proactively announced through MID messages. MID messages processing does not differ from the processing specified in the OLSR standard.

Moreover, the solution described herein enables a node to become a gateway or vice versa. In particular, a gateway that becomes a node after losing connectivity towards the external network can receive downlink traffic immediately by using the other gateways that are still present in the MANET.

The present invention thus relates to a method for controlling routing operations in a network, to a related network and to a computer program product therefore, as defined in the attached claims.

BRIEF DESCRIPTION OF THE ANNEXED DRAWINGS

The invention will now be described, by way of example only, with reference to the enclosed figures of drawing, wherein.

DETAILED DESCRIPTION OF PREFERRED
EMBODIMENTS OF THE INVENTION

Figure 1B:
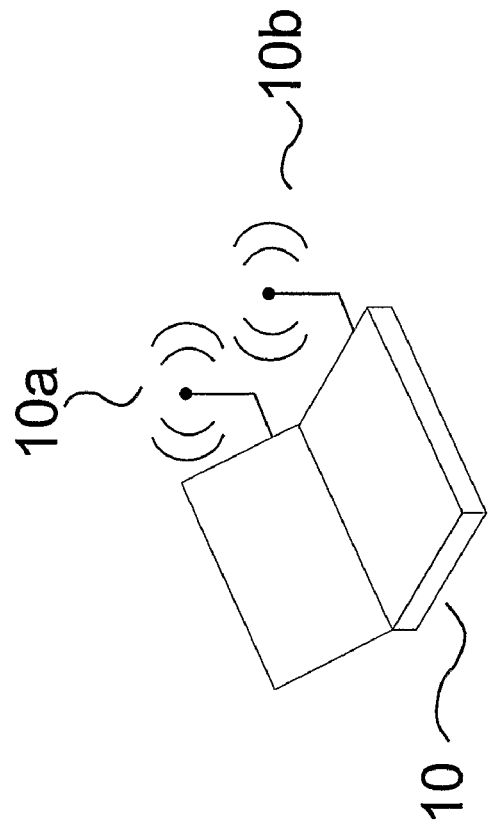
FIGS. 1a and 1b show two examples of equipment of a mobile terminal in a hybrid network.
Figure 1A:
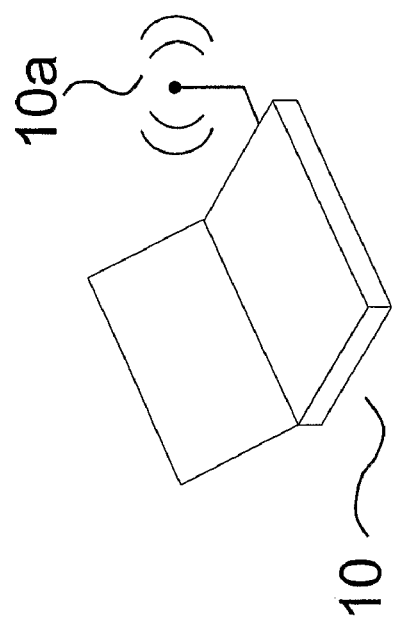
Figure 2:
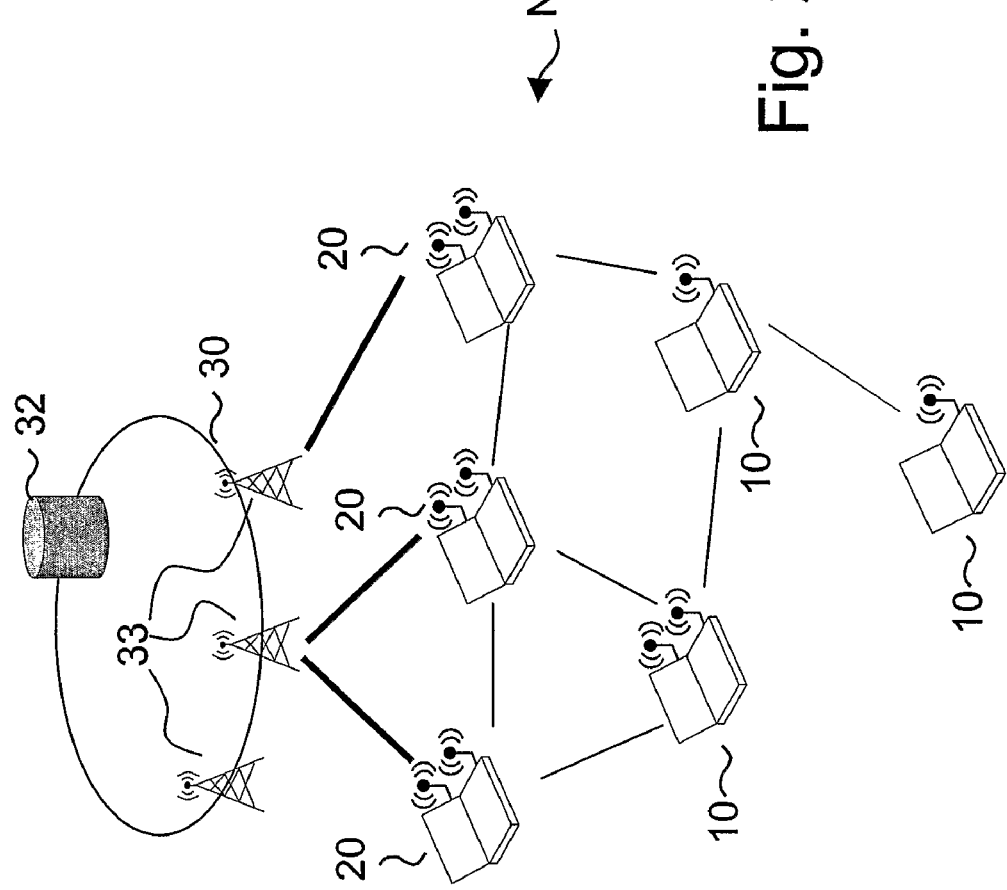
FIG. 2 shows an example of a MANET network linked with a cellular network.

FIGS. 1a and 1b show, respectively, two examples of equipment of a mobile node 10 in a hybrid ad-hoc network, generally designated N in FIG. 2. Specifically, FIGS. 1a and 1b may refer, by way of example, to any of the mobile nodes designated with 10 in the rest of the description.

FIG. 2 depicts the general context of application considered herein, namely, an ad-hoc network N comprising a set of nodes (designated 10 and 20) wherein topological information on the network N is broadcast to all the nodes 10, 20 in the set. The network N has associated an external network 30 with infrastructure. In the illustrative embodiment of FIG. 2, the network N is a Mobile Ad-hoc Network (MANET) and the external network 30 is a mobile-radio network (or "cellular network") suitable to provide access to Internet. The mobile-radio network 30 comprises a server 32 and a plurality of radio stations 33. A number of nodes 20 of the network N are adapted to perform a gateway function between the MANET N and the external network 30 and will be referred to as gateways 20.

Figure 3:
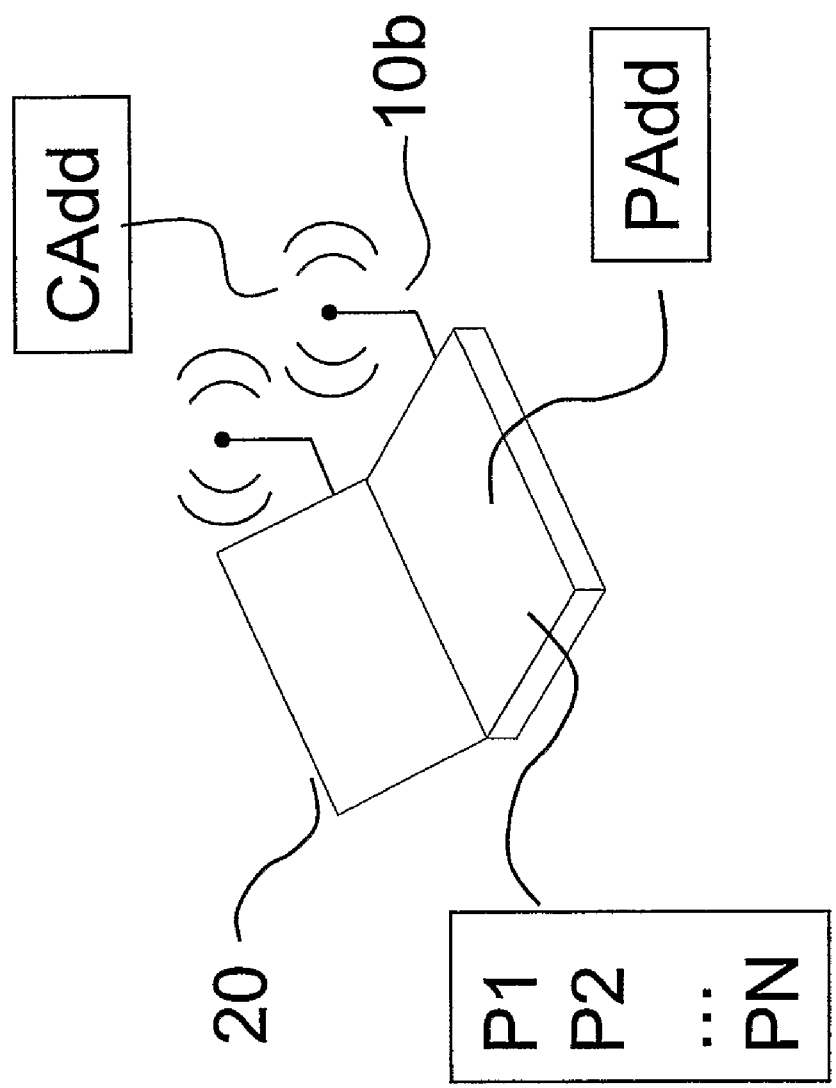
FIG. 3 shows address attributes of a MANET node.

More to the point, the solution described herein preferably applies to a MANET with the following, exemplary characteristics:

- as shown in FIGS. 1a and 1b, all the nodes of the MANET are equipped with a Wireless Local Area Network Interface (or "WLAN Interface") 10a of a known type, which enables direct delivery of data to other nodes in a transmission range; each node may possibly be equipped with more than one WLAN interface 10a, for example for connections at different bit-rates;
- as shown in FIG. 1b, certain of the nodes of the MANET are also equipped, in addition to the above interface 10a, with a second radio interface, namely a Cellular Network Interface (or "CN Interface") 10b of a known type, which allows interconnection with the external network 30; these nodes are also preferably equipped with a SIM-card (not shown);
- some of the nodes equipped with both types of interfaces 10a and 10b have an active link towards the external network 30 by means of the CN interface 10b; these nodes are the above-mentioned gateways 20;
- other MANET nodes, which are not equipped with a cellular network interface 10b or which do not have an active link towards the external network 30, communicate with hosts located in the Internet by means of a multi-hop connection to the gateways 20, through other nodes; these are the MANET nodes, or terminal nodes, and are indicated with 10 in FIG. 2;
- all nodes of the MANET run a Network Protocol, e.g. IPv6, and have an address configured on each of their interfaces. In particular, the gateways 20 have an address CAdd configured on the CN Interface 10b, as shown in FIG. 3. Moreover, the gateways 20 own one or more delegated prefixes (P1 . . . PN) that they can assign to other MANET nodes 10 to allow connection with the external network 30. These prefixes can be statically configured or dynamically acquired during cellular link activation (e.g. by Dynamic Host Configuration Protocol and Dynamic Host Configuration Protocol prefix delegation protocol);
- all nodes of the MANET run the OLSR protocol. OLSR permits to use an address, which is independent from the IPv6 addresses configured on the node's interfaces, to identify the nodes and their messages. Such address is called "primary address" and is indicated with PAdd, as shown in FIG. 3. The primary address PAdd may be for example an IPv6 address, which can be statically or dynamically configured. A node uses its primary address PAdd to participate to OLSR protocol. As such, all OLSR messages transmitted by a node contain the primary address of that node into the OLSR "Originator Address" field. Moreover, OLSR normally assumes that each node has one address configured on each interface connected to the MANET: such addresses are defined as "Interface Addresses". If a node is connected to the MANET by means of more than one interface, all its interfaces must be listed into MID (Multiple Interface Declaration) messages, which are periodically generated by the nodes and broadcasted over the MANET.

According to the present invention, each node has also associated one or more secondary address, which are preferably valid global IPv6 addresses, and which are used as source address for outgoing traffic. Building and use of secondary addresses will be described in greater detail later on.

The solution described herein comprises two main phases: a first phase called "set-up phase" and a second phase called "normal operation process". The set-up phase performs global addressing of the MANET nodes to allow communication with the Internet. This phase involves three steps, as described in the following.

The first step of the set-up phase is called "Path Discovery within the MANET" step. During this step the MANET nodes 10, 20 exchange OLSR control messages, as specified in the OLSR standard, by using their Primary Addresses PAdd in the Originator Address field. In particular, gateways 20 generate and broadcast Host and Network Association (HNA) messages: by means of these messages, all nodes become aware of which are the gateways 20 in the MANET and set-up a route towards the external networks.

At the end of this step, by means of the OLSR messages reception and processing, the nodes 10, 20 own a path to all the other nodes 10, 20, identified through their Primary Addresses PAdd, and a routing table listing all these paths can be built. In this step the nodes of the MANET are not reachable from the external network 30 by their Primary Address PAdd as IPv6 destination address, and can only communicate with the other MANET nodes. In the same way, the nodes cannot use their PAdd as IP Source Address for communication outside the MANET.

Figure 4:
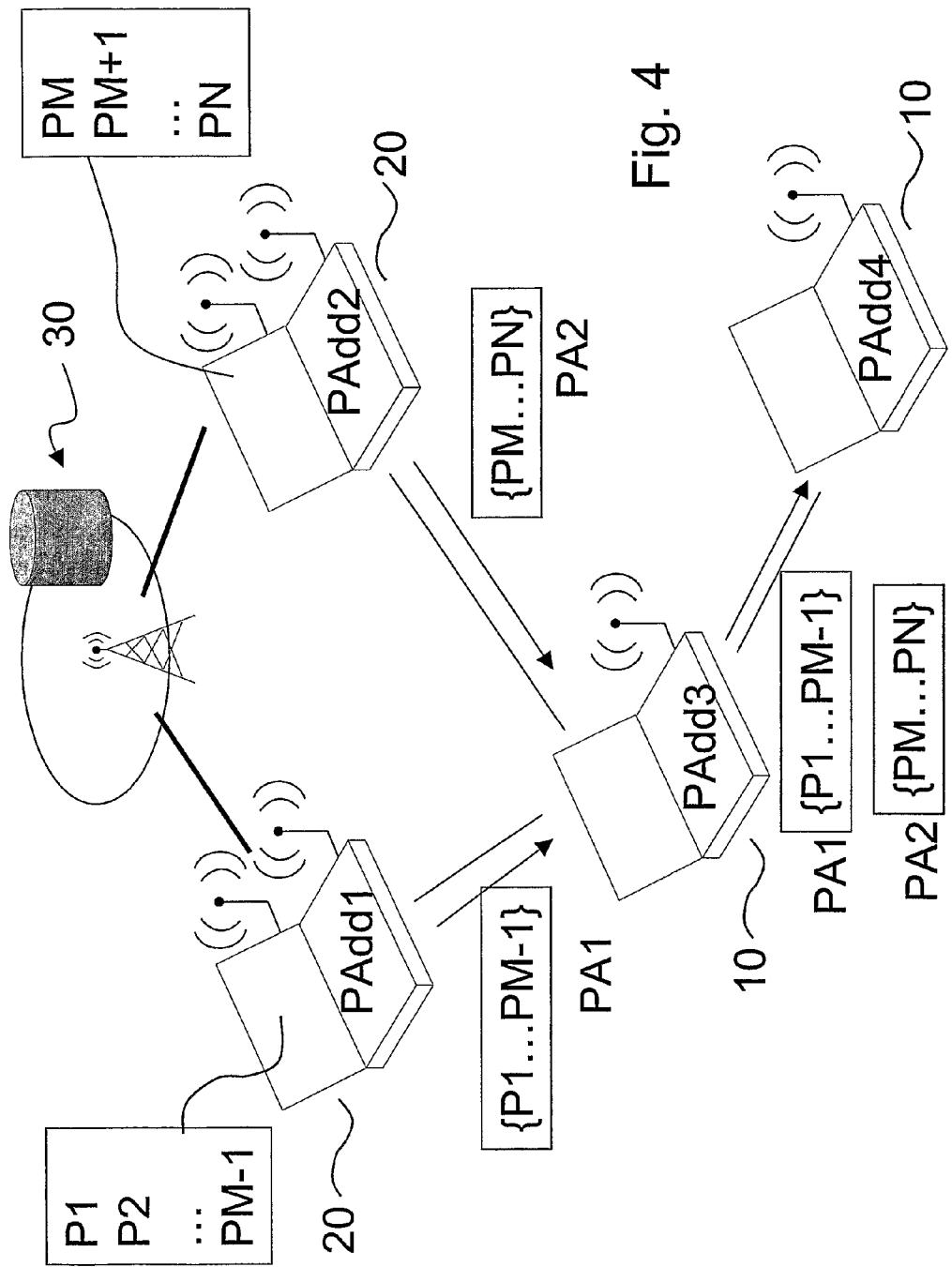
FIG. 4 shows a typical scenario of the arrangement described herein.

With reference to FIG. 4, the second step of the set-up phase can be defined as "Transmission and Reception of Prefix Advertisement" step. In this step, the gateways 20 periodically disseminate delegated prefixes (P1, . . . , PN), which are required to build the global addresses of the MANET nodes. Each gateway 20 has associated therewith one or more prefixes. These prefixes are disseminated in the MANET by means of Prefix Advertisement (PA) messages implemented as OLSR messages. In particular, PA messages are broadcast over the MANET through an OLSR default forwarding algorithm called Multi Point Relay (MPR) and are received by each node in the MANET. In the illustrated embodiment of FIG. 4, the two represented gateways 20 generate respective PA messages PA1 and PA2 to disseminate respective sets of delegated prefixes P1 . . . PM−1 and PM . . . PN. PA messages can be considered complementary to HNA (Host and Network Association) messages, whose content is used by the MANET nodes to set up their default route, as specified in the first step, and therefore to send uplink traffic to hosts located outside the MANET.

Each PA message has an OLSR header including an originator address field containing the gateway primary address (PAdd1 and PAdd2 in FIG. 4). Each PA message comprises two further fields, called "Network Address field" and "Netmask field", which contain a global prefix associated to the gateway (in particular, these fields specify the address and the netmask of the external network reachable through the gateway).

The solution described herein allows building a data OLSR structure, named Prefix Table, for PA message contents management. The following Prefix Table is referred to the particular example of FIG. 4. This table is OLSR dynamically updated upon reception of PA messages.

PREFIX TABLE

| P_GW_Add | P_Net_Add | P_net_Mask | P_Time |
|---|---|---|---|
| Padd1 | P1 | P1_netmask | PtimeValue |
| PAdd1 | P2 | P2_netmask | PtimeValue |
| ... | ... | ... | ... |
| PAdd1 | PM-1 | PM-1_netmask | PtimeValue |
| PAdd2 | PM | PM_netmask | PtimeValue |
| ... | ... | ... | ... |
| PAdd2 | PN | PN_netmask | PtimeValue |

The Prefix Table has four columns; each associated with a respective field, indicated with P_GW_add, P_Net_addr, P_Net_mask, P_time. Each Prefix Table entry line corresponds to a different set of values of these fields and contains the information regarding a prefix announced by a gateway. In greater detail:
  P_GW_add is the primary address of the gateway that generated the processed PA message;
  P_Net_addr and P_Net_mask are respectively the Network Address and the Net-mask of the global prefix inserted into the PA message;
  P_time is the time until which the line is valid).

Upon reception of a PA message, each node 10 creates a line into the Prefix Table initializing the corresponding fields, or refreshing P_time if the line is already present in the Prefix Table. In particular, P_time is initialized to a default value PtimeValue and is refreshed each time a subsequent PA message is received, using the value contained in the "Vtime" field (defined in OLSR standard) of the OLSR message header. A line is removed when P_time expires.

Each node 10 chooses its global prefix, used to configure its global address, by examining the metric (e.g. the distance in hops) associated to each gateway 20: for each node 10 of the MANET, such information is contained into the routing table. A node 10 shall choose the global prefix associated to the gateway 20 which has the best metric value, according to the routing table metrics. This gateway will be called "best" gateway or "default" gateway.

The third step of the set-up phase is called "Interface configuration with global IPv6 address" step and it is performed for configuring each interface 10a of nodes 10, with a global IPv6 address to be used for data transmission. In this step, each node 10 looks up in the Prefix Table and chooses the line corresponding to the best gateway 20. Then the node 10 builds its global IPv6 address, attaching the value contained in the field P_Net_addr of the chosen line to a unique 64-bit interface identifier. According to the IPv6 stateless auto-configuration, this identifier can be an End-System Unique Identifier ("EUI-64 identifier"), e.g. derived from the MAC address of the node. As described in F. Dupont, L. Nuaymi, "IMEI-based universal IPv6 interface IDs", IETF Internet draft, available on the web site address http://www.ietf.org/internet-drafts/draft-dupont-ipv6-imei-07.txt, the International Mobile Subscriber Identity of a SIM-card can be used for this purpose. If the Prefix Table contains more than one line associated with the best gateway, the node 10 will choose one of these lines according to a predetermined criterion; for example, it can simply choose the first one in the list.

The address so obtained is here identified as a "best" secondary address. This secondary address is configured on the interface 10a of node 10. In a similar manner, the considered node 10 builds further secondary addresses by attaching the other announced prefixes contained in the Prefix Table (i.e., the announced prefixes not associated with the best gateway 20) to the unique 64-bit interface identifier.

A plurality of secondary addresses (SAdd1, . . . , SAddN) is therefore built, one for each received prefix. Alternatively, the considered node could use only a sub-set of the prefixes and therefore build a number of secondary addresses lower than the total number of prefixes.

Figure 5:
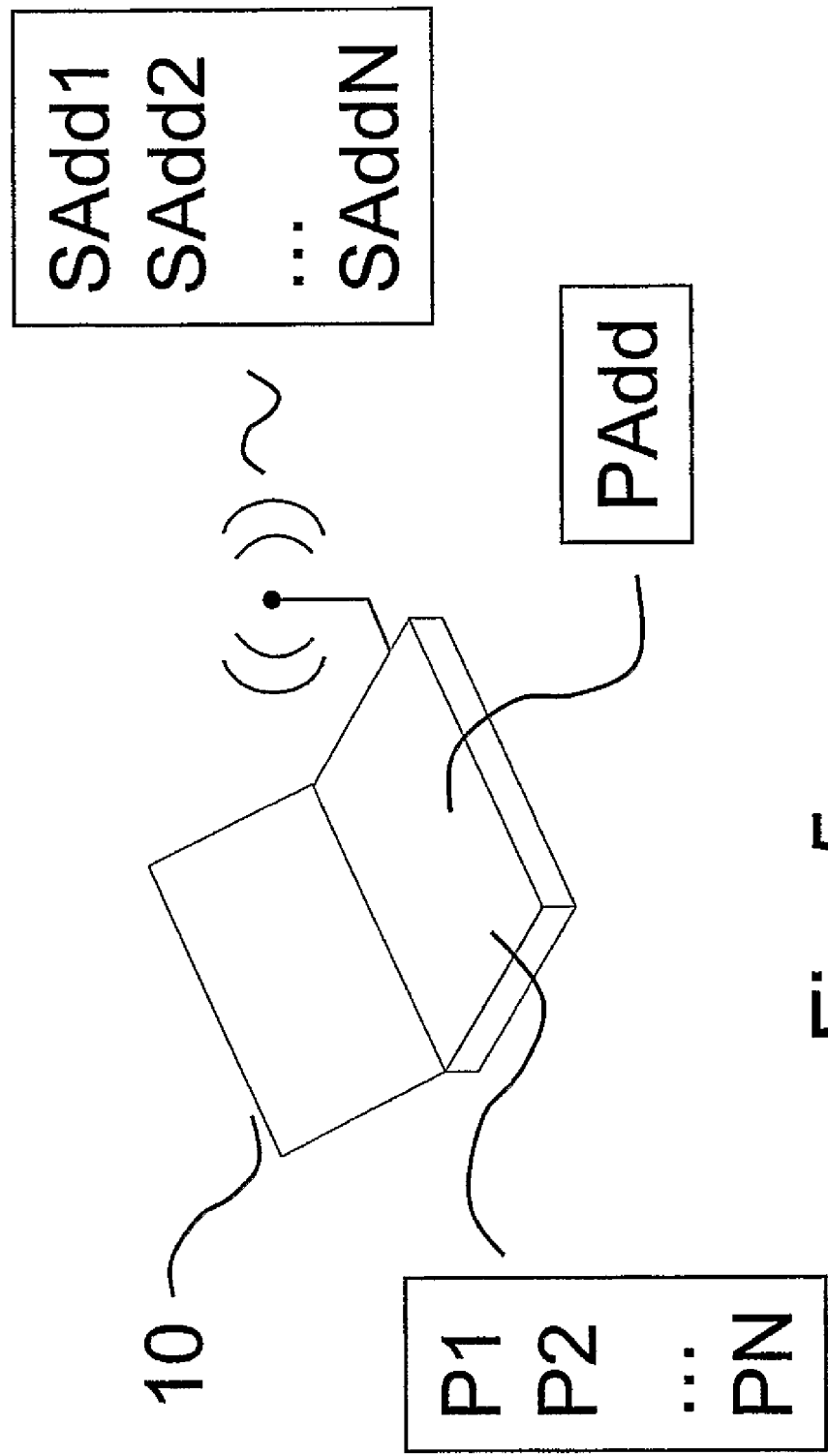
FIG. 5 shows address attributes of a MANET node.

The considered node 10 can optionally configure on its interface 10a all the secondary addresses (SAdd1, . . . , SAddN), as shown in FIG. 5, or a subset of them.

The normal operation process includes a step called: "Broadcasting of MID messages" step.

Figure 6:
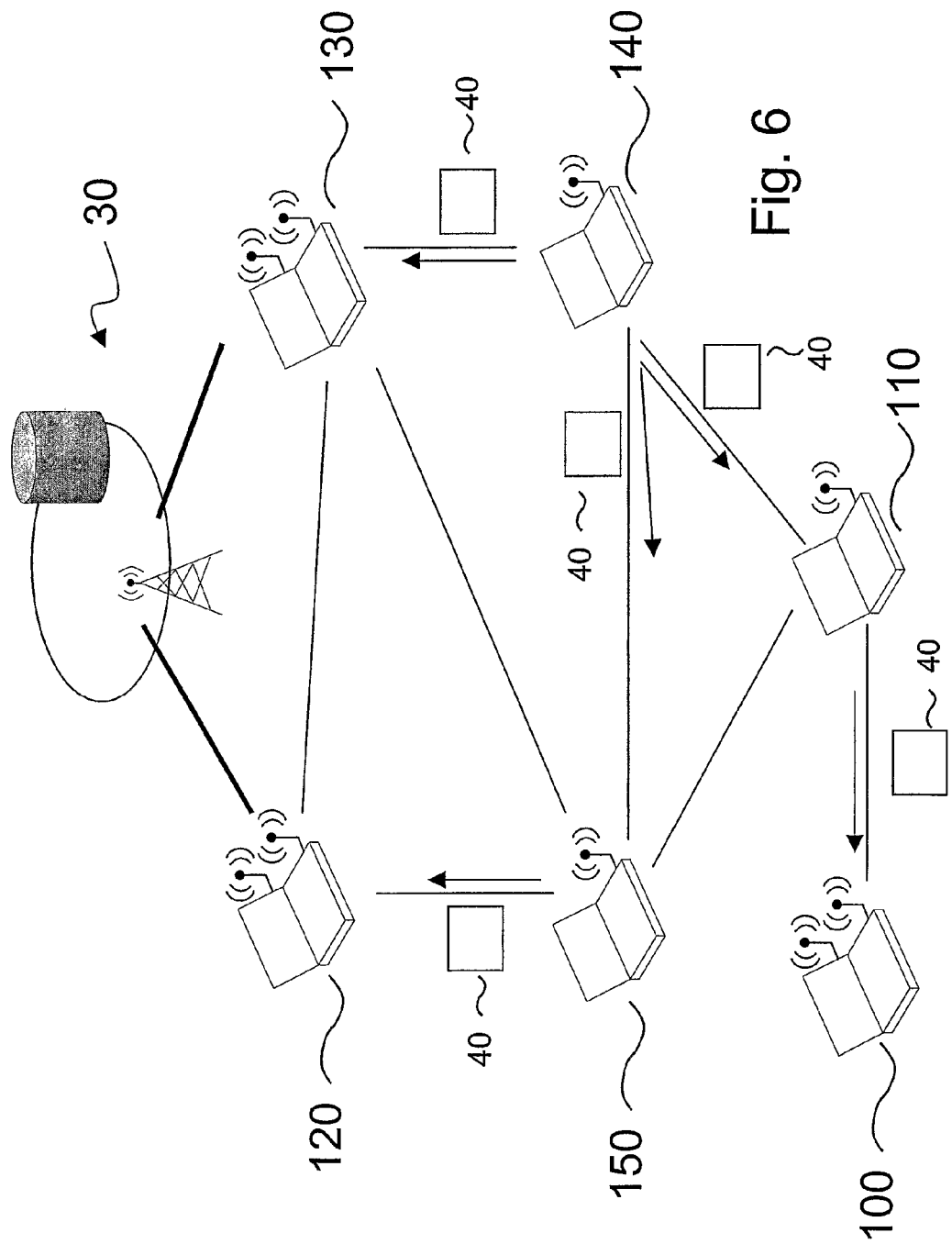
FIG. 6 shows an example of message exchanges among nodes in the network.

As shown in FIG. 6, the different nodes of the MANET, here indicated with 100, 110, 120, 130, 140 and 150, start broadcasting Multiple Interface Declaration (MID) messages 40, each containing the secondary addresses configured on the interfaces 10a in the third step of the set-up phase, which are derived from the prefixes announced by the best gateway, and all the other secondary addresses built in the third step of the set-up phase, or a subset of them.

FIG. 6 shows for example a plurality of MID messages 40 broadcasted in the MANET by node 140. By means of the standard MID messages processing, the MANET nodes routing tables contain a route for each secondary address listed into the MID messages.

Reproduced below is an example of routing information contained in the routing table related to node 100 in FIG. 6, where "TC" are Topology Control messages, "Hello" are Hello messages, both as defined by OLSR standard. SAddX{Y} means Secondary Address X of Node Y.

```
120 -
From TC msgs:
  PAdd{120} - Next HOP = PAdd{110}
From MID msgs:
  PAdd{120}:  SAdd1{120} - Next HOP = PAdd{110}
              SAdd2{120} - Next HOP = PAdd{110}
130 -
From TC msgs:
  PAdd{130} - Next HOP = PAdd{110}
From MID msgs:
  PAdd{130}:  SAdd1{130} - Next HOP = PAdd{110}
              SAdd2{130} - Next HOP = PAdd{110}
110 -
From Hello msgs:
  PAdd{110} - NEIGHBOR
From MID msgs:
  PAdd{110}:  SAdd1{110} - NEIGHBOR
              SAdd2{110} - NEIGHBOR
150 -
From Hello msgs:
  PAdd{150} - Next HOP = PAdd{110}
From MID msgs:
  PAdd{150}:  SAdd1{150} - Next HOP = PAdd{110}
              SAdd2{150} - Next HOP = PAdd{110}
140 -
From Hello msgs:
```

-continued

```
PAdd{140} - Next HOP = PAdd{110}
From MID msgs:
    PAdd{140}:   SAdd1{140} - Next HOP = PAdd{110}
                 SAdd2{140} - Next HOP = PAdd{110}
```

A packet whose destination is one of the secondary addresses of a node (e.g. downlink traffic) can therefore be routed within the MANET. All the topological information received and generated by MANET nodes is associated to nodes primary addresses and are therefore independent from the global address configuration of the nodes.

A node 10 stops inserting a secondary address into MID messages if it detects that the gateway 20 associated to the prefix used to configure that secondary address has failed. If the failed gateway 20 is bound to a prefix associated with a secondary address used for data session, the node considers such address invalid and chooses another one of its secondary addresses. If this secondary address has not yet been configured on the interface 10a, the considered node 10 configures it on the interface 10a. The chosen secondary address must be the one whose global prefix corresponds to the best gateway among the currently active gateways 20. Such choice (made upon the information obtained by the routing table) optimizes downlink traffic routing.

MID message and PA message processing must be executed by gateways 20 too. The only operation a gateway 20 does not have to do is configuring any secondary address on its interface 10a, because gateways 20 already own a global address (CAdd) configured on the 10b interface.

According to a preferred embodiment of the solution described herein, in case of data transmission to an external host, a node 10 sends outgoing traffic using as IP header source address the secondary address associated to the default gateway 20 chosen by OLSR.

In case of gateway changes due to topology changes, or, in general, due to route metric changes, a node executes the following operations:

it chooses another active gateway as its new default gateway, by looking at the Routing Table. In particular, the node chooses, among the active gateways, the one currently associated with the best metric value. This operation is performed seamlessly by each node;

it changes its global address by looking at the Prefix Table: the chosen address corresponds to the prefix of the new default gateway. In case the considered gateway has associated more than one prefix, the node will choose one of these prefixes according to a predetermined rule, for example it may choose the first one in the Prefix Table. If the new global address is not configured on the interface 10a, the node 10 configures it on the interface 10a. Then, the node 10 starts using this new global address as IP source address.

Typically, this address has been already announced with MID messages: this means that all the other MANET nodes already know the correct path to reach the node 10 by this address, therefore avoiding it to bootstrap OLSR with the new address; the time in which the node is not reachable by other hosts and cannot therefore communicate with them is consequently reduced (ideally to zero).

A gateway 20 that becomes a node 10 executes the operations that a normal node 10 performs after the change of its default gateway. In such case, the node 10 that previously was a gateway 20 chooses the secondary address corresponding to the best active gateway 20 and configures it on its interface 10a. Such configuration permits the node to communicate with the hosts located outside the MANET. As the node 10 that was previously a gateway 20 has always been sending MID messages, the communication is not affected by any latency.

Therefore, the change of a gateway 20 introduces negligible latency and allows the MANET node 10 that has changed the address to communicate with other hosts immediately after the address change, due to the fact that a node 10 avoids bootstrapping OLSR every time it changes gateway 20 and address.

In particular, the reduction of such latency implies better performances when the MANET nodes use Mobile IPv6. In fact, according to the solution described herein, if a node 10 experiments a change from a first gateway to a second gateway and it is using, as Mobile IP Care-of Address, an address which is derived from the prefix announced by the first gateway, it will choose the second gateway and a secondary address associated to the second gateway, and then it will send a Binding Update message to its Home Agent (which is located within the external network), registering the new chosen address as the new Care-of Address. The Home Agent responds with a Binding Acknowledge message.

When the Binding Acknowledge message from the Home Agent arrives at the gateway 20, immediately a route to the node 10 will be available, because the new Care-of Address was announced in the MANET using the MID messages. Therefore, handover latency is reduced to the time needed to send a Binding Update message and receive the correspondent Binding Acknowledge message, because routing latency is negligible.

Moreover, the proposed invention optimizes the routing path of the downlink traffic generated by hosts located outside the MANET. In fact, the choice of a particular prefix defines the gateway 20 to which external hosts route packets directed to MANET nodes 10, whose addresses are derived from that prefix.

With the proposed solution, a node 10 first chooses the best gateway 20 and then configures its own global address using the global prefix advertised by the chosen gateway 20. The best gateway 20 is selected with the same mechanism of default gateway selection used by OLSR: in this way, the two gateways 20 will generally be the same and, therefore, uplink and downlink traffic will follow the same optimal path.

Moreover, the invention enables a gateway 20 to become a node 10 and permits it to communicate with any other host immediately after it has become a node 10.

The solution just described can be generalized to any routing protocol, which broadcasts topological information to all nodes. The solution can be applied for broadcasting address information related to each node, by means of routing protocol messages.

Gateways 20 can be fixed nodes, i.e. they do not change their geographical location. The uplink interface on the gateways 20 can be a wired interface.

The solution described herein can be applied to hybrid MANETs connected to any type of external infrastructure network.

Moreover, the solution described herein can be applied to any IP network, comprising terminals and/or routers, wired or wireless.

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method of controlling routing operations in a communication network, wherein said network is associated with an external network and comprises a set of nodes, each of which has associated therewith a primary address for internal communication within said network, said set of nodes comprising terminals and gateways, said gateways being suitable to provide connections between said terminals and said external network, comprising the steps of:

sending from the gateways to the terminals first messages containing global prefixes;

building for each of said terminals one or more secondary addresses based on said global prefixes, said secondary addresses being independent from said primary addresses and defining valid global internet protocol addresses;

generating in each of said terminals a respective second message containing at least a sub-set of the corresponding secondary addresses; and broadcasting the second messages to all the terminals of the set of nodes.

2. The method of claim 1, wherein each of said gateways has associated therewith one or more respective secondary addresses and wherein the method comprises the step of generating in each of said gateways a respective second message containing the respective secondary address, and the step of broadcasting the second messages generated by said gateways to all the nodes of said set.

3. The method of claim 1, wherein the second messages generated by said terminals are broadcast to all the nodes of said set.

4. The method of claim 1, comprising the steps of achieving connectivity within said network through said primary addresses and achieving global connectivity with said external network by processing said first messages.

5. The method of claim 1, wherein each terminal has at least one interface and wherein the method comprises the step of configuring on said interface said at least a sub-set of said secondary addresses before the step of generating the second message.

6. The method of claim 1, wherein each of said gateways has associated therewith at least one of said global prefixes and wherein the step of sending from the gateways to the terminals first messages comprises sending from each gateway to the terminals respective first messages containing the respective global prefixes.

7. The method of claim 1, wherein each of said gateways has associated therewith a corresponding primary address for connectivity within said network and comprising the step of running on the nodes of said set a routing protocol that allows use of said primary addresses to identify the nodes in the connectivity within said network.

8. The method of claim 1, wherein each of said gateways has associated therewith at least one of said global prefixes and wherein the method comprises the steps of selecting a default gateway for each of said terminals and building in each terminal at least a secondary address related to a global prefix of said default gateway for communication with said external network.

9. The method of claim 1, wherein the step of building one or more secondary addresses comprises attaching one or more of said global prefixes to an individual interface identifier of the terminal.

10. The method of claim 1, wherein said second message contains all the secondary addresses of the corresponding terminal.

11. The method of claim 1, comprising, in case of failure of a gateway, the step of discontinuing the broadcast of the second addresses whose global prefix is related to said failed gateway in the second messages.

12. The method of claim 1, comprising sending outgoing traffic from one of said terminals toward said external network through a gateway by using as internet protocol header source address a secondary address associated with said gateway.

13. The method of claim 12, further comprising switching said outgoing traffic through another gateway by using as internet protocol header source address another secondary address associated with said another gateway.

14. The method of claim 1, comprising broadcasting topological information regarding the network to all the nodes in the set.

15. The method of claim 1, comprising the step of building a routing table indicating the routes between the nodes of the set before the step sending the first messages.

16. The method of claim 15, wherein building one or more secondary addresses comprises choosing from the routing table, the gateway having the best metric value, and building secondary addresses based on a global prefix associated with said gateway having the best metric value.

17. A computer readable medium encoded with a computer program product loadable in a memory of at least one computer, the computer program product comprising software code portions for performing the method of claim 1.

18. A communication network with controlled routing operations, the network being connectable to an external network and comprising a set of nodes, each of said nodes having associated therewith a primary address for internal communication within said network, said set of nodes comprising terminals and gateways, said gateways being suitable to provide connections between said terminals and said external network, wherein: each gateway being configured to send a plurality of global prefixes to the terminals of the nodes;

each node in said set has associated therewith one or more respective secondary addresses independent from said primary addresses, said secondary addresses being valid global internet protocol addresses—based on global prefixes; and each node in said set is configured for using one of said secondary addresses as source address of communication traffic toward said external network for generating interface messages containing its secondary addresses and for broadcasting said interface messages to the other nodes of said set.

19. The network of claim 18, wherein topological information regarding the network is broadcast to all the nodes in said set.

20. The network of claim 18, wherein the nodes of said set are configured for achieving connectivity within said network through said primary addresses and to achieve global connectivity with said external network by processing said interface messages.

21. The network of claim 18, wherein each node of said set has at least an interface and has configured on said interface all its secondary addresses.

22. The network of claim 18, wherein said secondary addresses are based on global prefixes and wherein each gateway has associated therewith one or more of said global prefixes and is configured for generating and broadcasting prefix advertisement messages containing its global prefixes.

23. The network of claim 21, wherein the terminals of said set are configured for running a routing protocol that permits the use of said primary address as a node identifier address independent from the secondary address configured on said interface.

24. The network of claim 22, wherein each terminal in said set is configured for selecting a default gateway according to a routing criterion and building at least a secondary address having a global prefix associated with said default gateway.

25. The network of claim 24, wherein each terminal of said set has an individual interface identifier and is configured to build the at least a secondary address by attaching the individual interface identifier to a global prefix associated with said default gateway.

26. The network of claim 22, wherein each terminal of said set is configured for discontinuing the broadcast of the second addresses whose global prefix is related to said failed gateway in the second messages.

27. The network of claim 18, wherein the terminals of said set are configured for sending outgoing traffic toward said external network by using as internet protocol global address a secondary address related to a global prefix of a first gateway, and for switching to a second gateway by starting using as internet protocol source address a secondary address related to a global prefix of the second gateway.

28. The network of claim 18, comprising a mobile ad-hoc network.

\* \* \* \* \*

UNITED STATES PATENT AND TRADEMARK OFFICE
CERTIFICATE OF CORRECTION

| | |
|---|---|
| PATENT NO. | : 7,586,897 B2 |
| APPLICATION NO. | : 11/666619 |
| DATED | : September 8, 2009 |
| INVENTOR(S) | : Ruffino et al. |

Page 1 of 1

It is certified that error appears in the above-identified patent and that said Letters Patent is hereby corrected as shown below:

On the title page, item (73), "Italis" should read --Italia--.

In claim 18, column 14, line 42, "addresses—based" should read --addresses based--.

Signed and Sealed this

Fourteenth Day of September, 2010

David J. Kappos
*Director of the United States Patent and Trademark Office*